Figure 1:
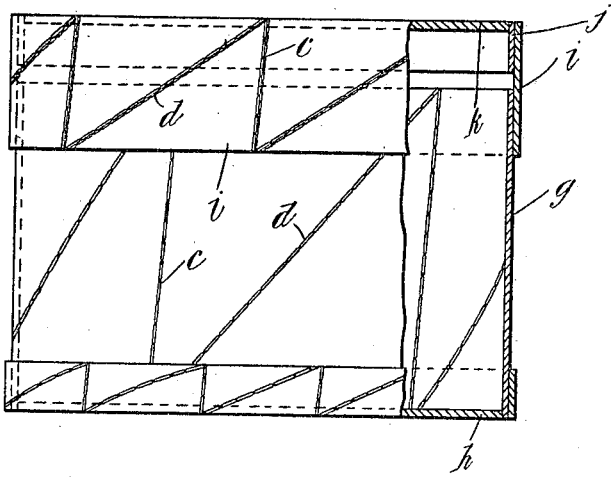

No. 830,795. PATENTED SEPT. 11, 1906.
D. J. MACPHERSON.
CHEESE BOX.
APPLICATION FILED JAN. 27, 1906.

Witnesses
Duncan James Macpherson
Inventor
By Attorney

UNITED STATES PATENT OFFICE.

DUNCAN JAMES MACPHERSON, OF LANCASTER, ONTARIO, CANADA.

CHEESE-BOX.

No. 830,795.            Specification of Letters Patent.            Patented Sept. 11, 1906.

Application filed January 27, 1906. Serial No. 298,279.

*To all whom it may concern:*

Be it known that I, DUNCAN JAMES MACPHERSON, of Lancaster, Province of Ontario, Canada, have invented certain new and useful Improvements in Cheese-Boxes; and I do hereby declare that the following is a full, clear, and exact description of the same.

The object of my invention is to provide a reinforced cheese-box capable of accommodating itself to a cheese of any weight. It is well known to the manufacturers and packers of cheese that all cheeses are of substantially the same diameter when they leave the factory and remain so, but that owing to climatic and other changes and different standards adopted by various factories they vary axially from about ten or twelve inches in length. Owing to this variation, a box coopered to fit a twelve-inch cheese at the factory is frequently required to be again coopered by the shipper. Furthermore, a shrinkage of the cheese removes the support it affords the box, and an excessive weight will break the latter. In order to obviate these defects, I reinforce in an improved manner the material from which the boxes are made and in conjunction with such reinforcement provide a telescopic construction adapted to accommodate itself to cheese of different axial measurement.

For full comprehension, however, of my invention reference must be had to the accompanying drawings, forming a part of this specification, and in which similar reference characters indicate the same parts, and wherein—

Figure 2:
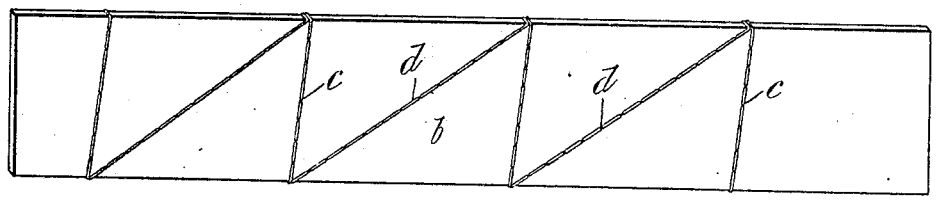
Figure 3:
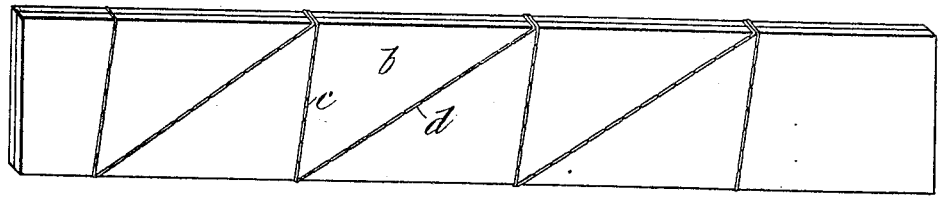
Figure 4:
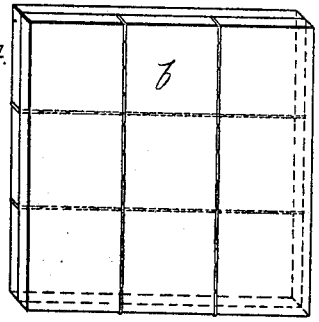
Figure 5:
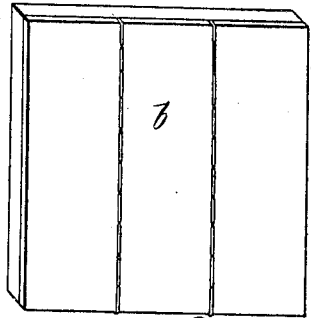
Figure 6:

Figure 1 illustrates a cheese-box constructed from material reinforced according to my invention. Fig. 2 is a detail perspective view of a piece of material reinforced according to my invention. Fig. 3 is a similar view of two pieces of material united and reinforced according to my invention. Fig. 4 is a similar view of two pieces of material reinforced according to my invention and glued together. Fig. 5 is a similar view illustrating my invention employed in veneer-work, and Fig. 6 is an enlarged sectional view illustrating the manner of arranging the stitching by means of which the cheese-box material is reinforced according to my invention.

The wooden material or veneering $b$ is stitched, preferably, with thread in transverse lines of lock-stitches extending, preferably, in diagonal lines $c$ (slightly out of the right angle) and lines $d$, connecting together the opposite ends of the contiguous diagonal lines $c$. This stitching reinforces the material or veneering and effectively prevents the same from splitting. The thread may, if desired, be waxed.

In the manufacture of cheese-boxes or other packages the reinforced material is cut and bent and the ends fastened in the usual manner, the thread stitching offering no obstacle to the cutting-tools. The hoop $g$ thus formed is preferably of less axial measurement than the smallest cheese, and it is connected in the usual way to the bottom heading $h$.

The cover consists of an outside rim $i$, reinforced by stitching, and an auxiliary bracing-rim $j$, preferably of the same diameter as the hoop $g$. These rims are secured rigidly together by stitching or otherwise and attached to the edge of the top heading $k$ by nails in the usual way or otherwise.

The outer rim $i$ is of sufficient axial measurement to overlap the edge of the hoop $g$ when the largest cheese is contained, and the measurement of the auxiliary rim is such as will clear the top edge of the hoop when the smallest cheese is contained, thus insuring that the headings will always rest in contact with the opposite ends of the cheese.

To meet the requirements of the manufacturers of cheese-boxes or other articles requiring reinforced material of greater thickness than the usual veneering—as, for instance, in connection with the cover-rims $i$ and $j$—two or more pieces are stitched together, as shown in Fig. 3, or such pieces are independently reinforced and then united by glue, nails, or in any other usual manner, as shown in Fig. 4.

My improved reinforced material in a single piece or sheet, as shown in Figs. 2 and 5, serves as a veneer.

I prefer to arrange the stitching in double lines, each consisting of a line of short stitches and a line of long stitches, as shown in Figs. 1 and 6.

The main advantage attendant upon cheese-box materials or veneerings reinforced according to my invention is that they will not split under ordinary conditions and will be to a certain extent stiffened.

What I claim is as follows:

1. A cheese-hoop consisting of a single layer of thin wood material having a reinforcing line of stitching extending across the grain thereof.

2. A cheese-box consisting of a body-hoop made of a single layer of thin wood material having reinforcing lines of stitching, a cover and a strengthening member within the cover.

3. A cheese-box consisting of a body-hoop, a bottom heading, means securing the hoop to the heading, a cover-rim having reinforcing lines of stitching, a top heading, an auxiliary rim within the cover-rim, such auxiliary rim encircling the top heading and corresponding in diameter to the body-hoop, and means securing the said rims in place.

4. A cheese-box consisting of a cover, and a body-hoop having reinforcing double lines of stitching each of such double lines being made up of a line of short stitches and a line of long stitches, and a strengthening member within the cover.

5. A cheese-box constructed of a single layer of thin wood material having a reinforcing double line of stitching extending across the grain thereof, such double line being made up of a line of short stitches and a line of long stitches.

In testimony whereof I have signed my name to this specification in the presence of two subscribing witnesses.

DUNCAN JAMES MACPHERSON.

Witnesses:
WILLIAM P. McFEAT,
FRED. J. SEARS.